(12) United States Patent
Duggan et al.

(10) Patent No.: US 7,865,079 B2
(45) Date of Patent: Jan. 4, 2011

(54) MWS DRIFT FEEDBACK COMPENSATOR USING VOA AND INPUT POWER DITHERING

(75) Inventors: Philip Duggan, Ottawa (CA); Krassimir Stoev, Ottawa (CA)

(73) Assignee: JDS Uniphase Corporation, Milpitas, CA (US)

( * ) Notice: Subject to any disclaimer, the term of this patent is extended or adjusted under 35 U.S.C. 154(b) by 603 days.

(21) Appl. No.: 11/926,559

(22) Filed: Oct. 29, 2007

(65) Prior Publication Data

US 2008/0101743 A1 May 1, 2008

Related U.S. Application Data

(60) Provisional application No. 60/863,395, filed on Oct. 30, 2006.

(51) Int. Cl.
*H04B 10/04* (2006.01)
*H04B 10/08* (2006.01)
*H04J 14/02* (2006.01)

(52) U.S. Cl. .......................... 398/33; 398/94; 398/185; 398/193; 398/197; 398/198

(58) Field of Classification Search ................ 398/33, 398/93, 94, 183, 185, 192, 193, 195, 197, 398/198
See application file for complete search history.

(56) References Cited

U.S. PATENT DOCUMENTS

| | | | | |
|---|---|---|---|---|
| 6,549,699 | B2 | 4/2003 | Besler et al. | 385/24 |
| 6,625,340 | B1 | 9/2003 | Sparks et al. | 385/18 |
| 6,671,085 | B2 * | 12/2003 | So et al. | 359/341.42 |
| 7,634,196 | B2 * | 12/2009 | Gerstel et al. | 398/83 |
| 2005/0168806 | A1 * | 8/2005 | Maeda et al. | 359/341.4 |
| 2008/0080865 | A1 * | 4/2008 | Muro et al. | 398/83 |
| 2008/0181612 | A1 * | 7/2008 | Mills et al. | 398/83 |

* cited by examiner

*Primary Examiner*—Dalzid Singh
(74) *Attorney, Agent, or Firm*—Teitelbaum & MacLean; Neil Teitelbaum; Doug MacLean (57) ABSTRACT

The invention relates to a compensator of attenuation drift in an optical multi-wavelength switch (MWS) which uses input signal amplitude dither and external VOA dither cancellation to determine relative position of MEMS micro mirror hence indirectly determining attenuation level.

18 Claims, 7 Drawing Sheets

MWS DRIFT FEEDBACK COMPENSATOR USING VOA AND INPUT POWER DITHERING

CROSS-REFERENCE TO RELATED APPLICATIONS

The present invention claims priority from U.S. Patent Application No. 60/863,395 filed Oct. 30, 2006 entitled "MWS drift feedback compensator using VOA and input power dithering", which is incorporated herein by reference.

TECHNICAL FIELD

The present invention relates to fiber-optic telecommunications optical devices in particular to multi-wavelength switch optical devices employing Micro-Electro-Mechanical Systems (MEMS) and, more specifically, to an attenuation drift compensator of such optical switch devices.

BACKGROUND OF THE INVENTION

Multi-wavelength switches (MWS) based on MEMS micro-mirrors are used in dense wavelength division multiple (DWDM) fiberoptic systems to combine a plurality of wavelength channels onto a common optical fiber. Such MWS switches have 'm' input ports and a single common output port. In operation, the user can select in a reconfigurable manner, which of the wavelength channels at the 'm' input ports are coupled through to the common output port. This selection is accomplished by knowing the voltage to apply to the MEMS micro-mirror actuator so that light is optimally coupled from the selected input port to the output port.

The MWS switch is also be used as a variable attenuator to attenuate the individual wavelength channels in order to equalize power in all the wavelength channels in the multiplexed light signal. The attenuation of each wavelength channel is controlled by detuning the coupling of light from the input port to the output port from its optimum value to a desired attenuation value. At the factory, the electro-optic response (coupled power versus micro-mirror tilt voltage) of each MEMS micro-mirror is measured in order to provide calibration voltages that can be used in determining the required voltage needed to obtain the desired attenuation. In this way, the calibration voltages are used in the control of an MWS switch.

Figure 1:
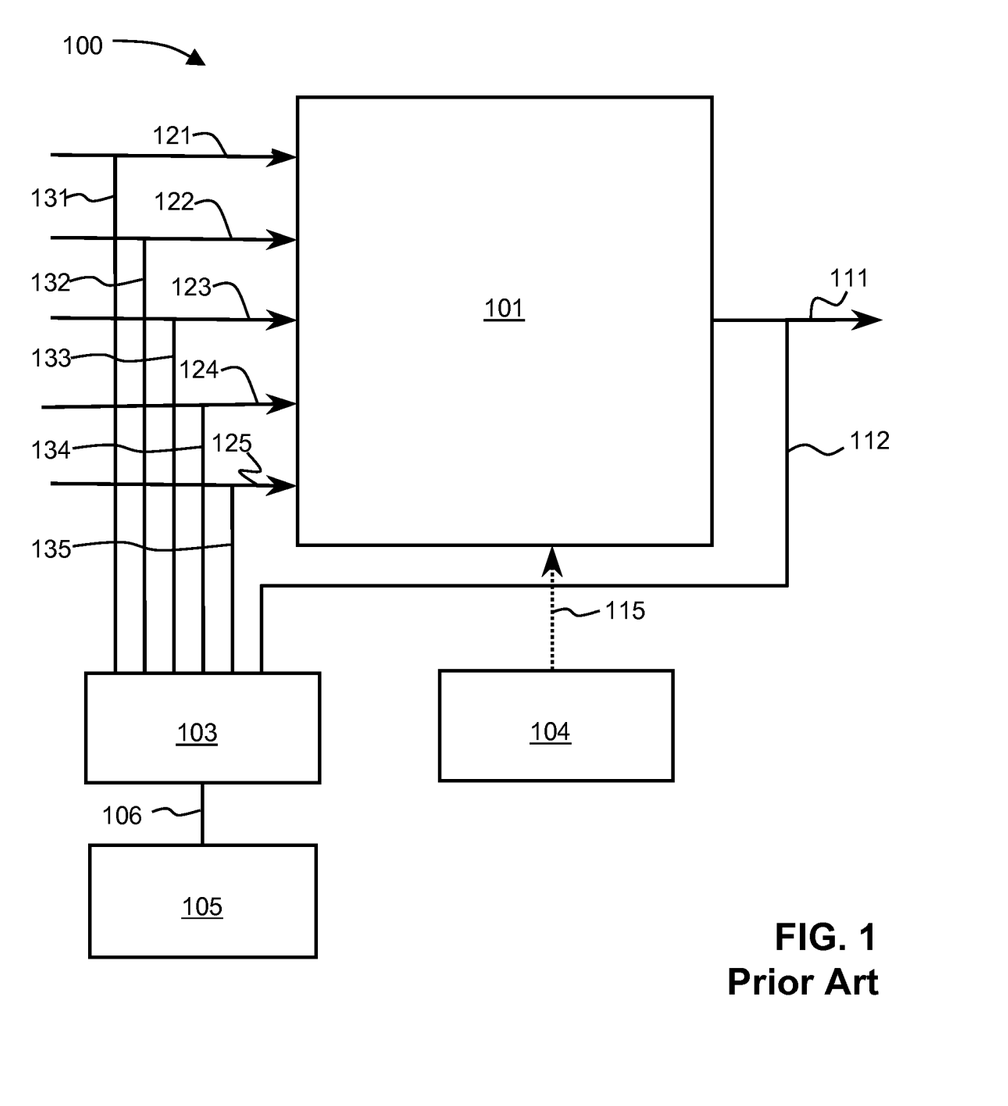
FIG. 1 is a schematic diagram of a prior art monitored MWS architecture.

A conventional prior art approach to measuring attenuation in an optical device is to directly measure the input and output signals as shown in FIG. 1. In a drift detecting and compensating optical system 100 an optical switch 101 such as a 5×1 MWS or similar device receives a plurality of input signals 121-125, from which a single one is selected by a controller 104 using a switch control 115 for transmitting to an output 111. The input signals 121-125 and the output 111 are tapped at a suitable split ratio, typically 10%, to input tap lines 131-135 and 112, respectively, which are connected to input ports on a 1×6 optical switch 103. An output 106 of the optical switch 103 can be controlled to select a signal from one of the input ports in order to feed it to an Optical Channel Monitor (OCM) 105 or similar equipment for measuring signal characteristics such as optical power, wavelength etc.

One such example is given by Sparks et al. (U.S. Pat. No. 6,625,340: Optical switch attenuator, Nortel Networks Limited) who teach calibrating an optical switch such that a predetermined (micro-) mirror misalignment produces a predetermined attenuation, so that only a single indication of the optical signal power is necessary. Such a power measurement could be performed substantially upstream or downstream of the optical switch, at a different point within the network if the attenuation characteristics of any intervening components are known. Alternatively, both the input and the output optical signal to the switch could be measured in order to directly indicate the degree of the attenuation of the optical signal as it passes through the switch. This information could be used to provide a closed loop feedback control system to ensure that the desired degree of attenuation is achieved for each optical signal (or channel).

A problem with this approach for controlling the MWS is that the electro-optic response of micro-mirrors can drift during operation for a variety different reasons. Thus the original calibration voltages for providing the desired attenuation values become inaccurate with time.

In a MWS the input and output signals potentially contain many signal channels, some of which are redundant at the input. Therefore the power levels from these sources must be measured independently with an OCM. The cost of an OCM is relatively high, therefore in practice it has to be shared amongst all inputs using an additional optical switch. With such a system, direct measurement of attenuation is relatively straightforward. The output and input signals are measured separately and then the attenuation can easily be calculated.

One advantage of this approach is the input signal from a channel entering a network at a particular node (an 'add' channel) can be verified prior to being commissioned.

Apart from additional hardware costs, there are several technical disadvantages of this approach. The input and output signals are not measured simultaneously, therefore any change in input power level during the measurement will appear as a shift in attenuation level. Any drift in the tap ratio over time will be also appear as an attenuation change. For smaller tap ratios this can be a significant issue.

To overcome the drift problem, devices and methods have been devised for determining the channel optical power levels by dithering the MWS attenuation.

Besler et al. (U.S. Pat. No. 6,549,699), for example, use a processing unit 104 in FIG. 1 to apply an appropriate alternating (or "dither") control signal 115 to a channel micro-mirror in optical switch 101, in superposition on the DC control signal for maintaining the channel micro-mirror at a particular pivoting position, thus stabilizing it against drift. Both the optical power level of the corresponding spectral channel and the rate of change in the optical power level (or the time derivative of the optical power level) at the micro-mirror's pivoting angle can thus be obtained. The rate of change in the optical power level is proportional to the slope of a calibrated or pre-measured coupling efficiency curve, and is therefore useful in locating a micro-mirror's pivoting angle corresponding to the measured optical power level. From the pivoting angle thus derived, the magnitude of the feedback control signal can be determined for applying to the channel micro-mirror, so as to achieve the desired coupling efficiency in a most effective manner.

While a method such as that disclosed by Besler et al. can provide feedback suitable for reducing drift, it introduces an optical power variation or dither on the output signal 111 of the optical switch 101. This can have detrimental effects on the performance of an optical transmission system in which a drift stabilized switch is used. The problem is exacerbated in cases where several such switches are cascaded in the system. Furthermore, Besler's method relies on the micro-mirror electro-optic characteristic remaining stable with respect to the calibration in both absolute optical power as well as the DC control signal 115.

Thus a need becomes apparent in the industry for a way to remove or mitigate the optical power variations or dither produced by optical switches similar to the one described above.

It is an object of instant disclosure to provide a remedy for the above problem by compensating for, or canceling the effects of, the aforesaid optical power variations or dither.

A further object of instant disclosure is to provide a remedy for the practical situation where the micro-mirror electro-optic characteristics drift with environmental changes and aging.

SUMMARY OF THE INVENTION

The present invention provides an apparatus and method for determining a pivoting angle of a micro-mirror, preferably as used in an optical switch such as a MWS. The invention can be applied just as well to other types of optical equipment whose attenuation or insertion loss can be varied in a continuous way.

In operation, a multi-wavelength optical output signal emerges from an output port of the optical switch, whose power is monitored by an optical power meter or detector. A controller transmits control signals for setting up micro-mirrors in the optical switch at a pivot angle to produce a desired attenuation on the output signal.

By superimposing a known amount of dither in the form of a periodical variations on the control signal, the optical power meter or detector can measure not only the power level of the output signal, but also the slope of an electro-optic characteristic of the optical switch.

From the slope, a processor in the controller can calculate the pivot angle of each micro-mirror, from which an effective attenuation can be derived.

The processor compares the derived attenuation value using calibration curves stored within a memory unit within the controller, calculates a correction and applies the correction to the control signal. In such a manner the drift of the electro-optic characteristic of the optical switch can be corrected.

To reduce the consequent variations on the output signal, a variable optical attenuator (VOA) is connected to the output port. The calculated variation in attenuation produced by the dither on the control signal is used by the processor to apply a compensating signal to the VOA so that a compensated output signal with reduced power variation is obtained.

The compensator of attenuation drift for MWS constructed in this way provides advantages of a MWS stabilized against drift while limiting output signal variations to low excursions so as to reduce adverse side-effects on the rest of a fiberoptic transmission network or system.

BRIEF DESCRIPTION OF THE DRAWINGS

The invention will be described in greater detail with reference to the accompanying drawings which represent preferred embodiments thereof, wherein.

DETAILED DESCRIPTION

The network architecture of many telecommunications systems employs optical switches and attenuators. Many network elements such as optical amplifiers, optical receivers and gain flattening filters require a predetermined optical power level to function correctly. Optical attenuators are devices which permit the optical power level to be regulated at strategic points in the telecommunications system. In some optical switch designs a switching function has been combined with an attenuation function. Over time and with ambient operating condition variations the amount of attenuation often drifts from the desired preset value, creating network performance problems. An efficient and accurate means is desired to overcome such problems.

A means is disclosed for determining the amount of drift, particularly in the form of an offset on an electro-optic response curve during the life of a MEMS-based multi-wavelength switch (MWS) device. Appropriate corrective action or compensation can thereby be taken for maintaining optimal coupling efficiency and thus device performance. The invention is based on the recognition that if the slope of the electro-optic response curve can be determined, an operating point of a MEMS micro-mirror on the electro-optic response curve can also be uniquely determined. According to the present invention, modulating the coupling efficiency at a dither frequency is used to determine the slope of the electro-optic response curve. The attendant optical power variation at an output of the MWS is compensated by the anti-phase dithering a variable optical attenuator (VOA) at the MWS output. Thus the impact of such dithering power variations on the downstream optical network or fiberoptic system can be mitigated and the overall telecommunications system performance enhanced.

Figure 2:
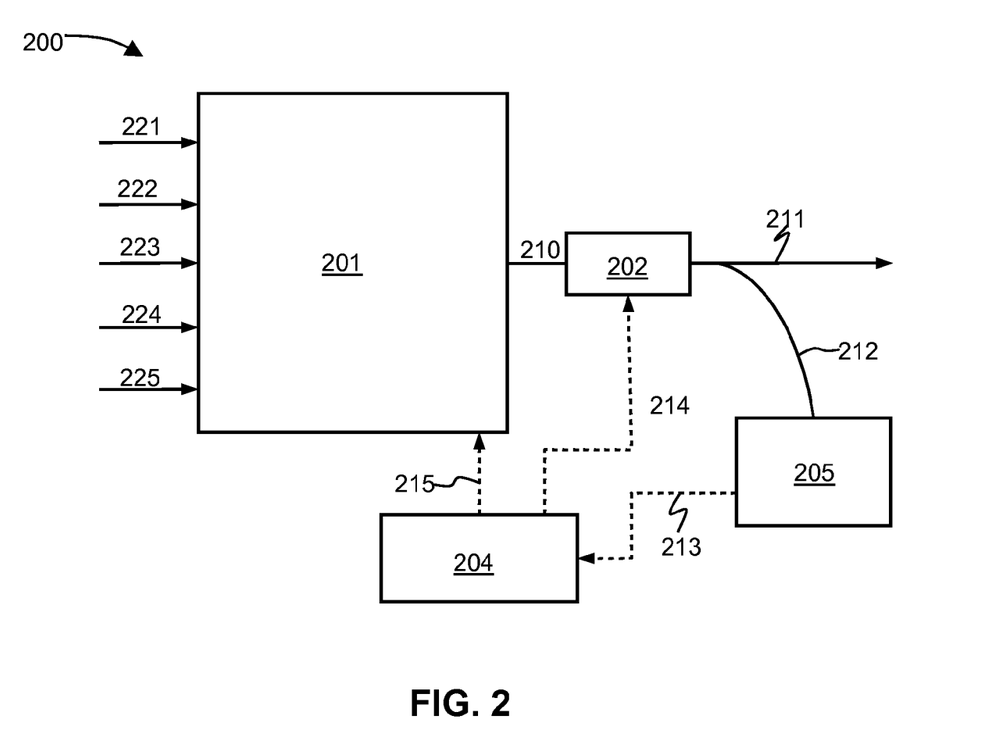
FIG. 2 is a simplified schematic diagram of 5×1 MWS with VOA and OCM on output.

FIG. 2 depicts an embodiment of a drift compensating apparatus 200 for an optical switch and reducing attendant output signal variation, such as drift, in accordance with the present invention.

An optical switch 201 such as a 5×1 MWS or similar device comprising a plurality of input ports 221-225 and an output port 210 is controlled by a controller 204 by means of a control signal 215. The number of input and output ports may vary according to different applications. The controller 204 configures the optical switch 201 by setting at least one switching element within the optical switch 201 to direct an incoming signal from one of the input ports 221-225 to the output port 210.

The switching elements are preferably MEMS micro-mirrors, which are individually controllable and continuously pivotable for reflecting spectral channels from the input ports 221-225 onto a single output port 210 or multiple output ports, where provided. The control signal 215 may be in the form of an analog electrostatic drive voltage, which is applied to the MEMS micro-mirrors.

The signal on the output port 210 is connected to a input port of a VOA 202, which outputs an attenuated signal 211 from an output port of the VOA 202. The attenuated signal 211 is then available for transmission to other parts of an optical network or fiberoptic system. An optical tap 212 removes a small portion of the attenuated signal, typically 10% for coupling into an optical channel monitor (OCM) 205 or other suitable detector. An OCM output signal 213 is transmitted to the controller 204 for processing and providing feedback. In turn, the controller 204 controls the VOA by a VOA signal 214.

The OCM 205 essentially monitors output power of an entire spectrum of channel signals on input ports 221-225. Only one port can be selected at the common output port 210 for each channel on the optical switch 201.

In operation, the slope of the electro-optic response curve is determined by varying the attenuation of the VOA 202 at a small sinusoidal frequency known as a dither frequency (typically about 0.1 Hz) with a small amplitude, such as ±0.5 dB.

Application of the electrostatic drive voltage to one of the micro-mirrors produces a corresponding angular deflection, which is proportional to the square of the electrostatic drive voltage, or equivalently, the square of the digital to analog converter (DAC) value in count units. The micro-mirror deflection may be used to misalign an internal optical beam from one of the input ports 221-225 with respect to the output port 210, thereby creating attenuation and increasing insertion loss (IL). Controlling attenuation by means of MEMS micro-mirrors is known in the art, as exemplified by, for instance, the disclosure of Besler et al. (U.S. Pat. No. 6,549,699).

The optical power transmitted from any one of the input ports 221-225 can thus be modulated by the controller 204 at the same dither frequency with an amplitude of approximately ±0.5 dB by modulating the IL with the applied electrostatic drive voltage to the micro-mirrors, but in anti-phase. That is, as attenuation in the VOA 202 is increased, attenuation in the optical switch 201 is decreased and vice-versa.

Thus the attenuating effect of the micro-mirror modulation on channel optical power is opposite to the attenuating effect of the modulation of optical power by the external VOA 202. That is, the modulated powers produced by the two dither modulations tend to cancel each other so that each wavelength channel is left with only a small residual modulation in optical power at the dither frequency.

The dither amplitude of micro-mirror is adjusted so this residual modulation decreases to approach zero. Once this condition is attained, a change in micro-mirror electrostatic drive voltage is measured that results in a 0.5 dB change in attenuation. The slope of the electro-optic response curve at the measured micro-mirror tilt at a set point of the electrostatic drive voltage can then be calculated. The measured slope is associated with a unique micro-mirror angular deflection, corresponding to a particular calibrated electrostatic drive voltage on the electro-optic response curve. By comparing this to the measured micro-mirror electrostatic drive voltage, an offset voltage is determined that is used to correct the calibration voltages used in controlling the micro-mirror angular deflection and thus attenuation in the optical switch 201.

The drift is characterized by a shift in the electro-optic response curve while the shape of the curve remains substantially unchanged. That is, the electrostatic drive voltage for optimum coupling of light from the input ports 221-225 to the output port 210 is offset from its original calibrated value.

Figure 3:
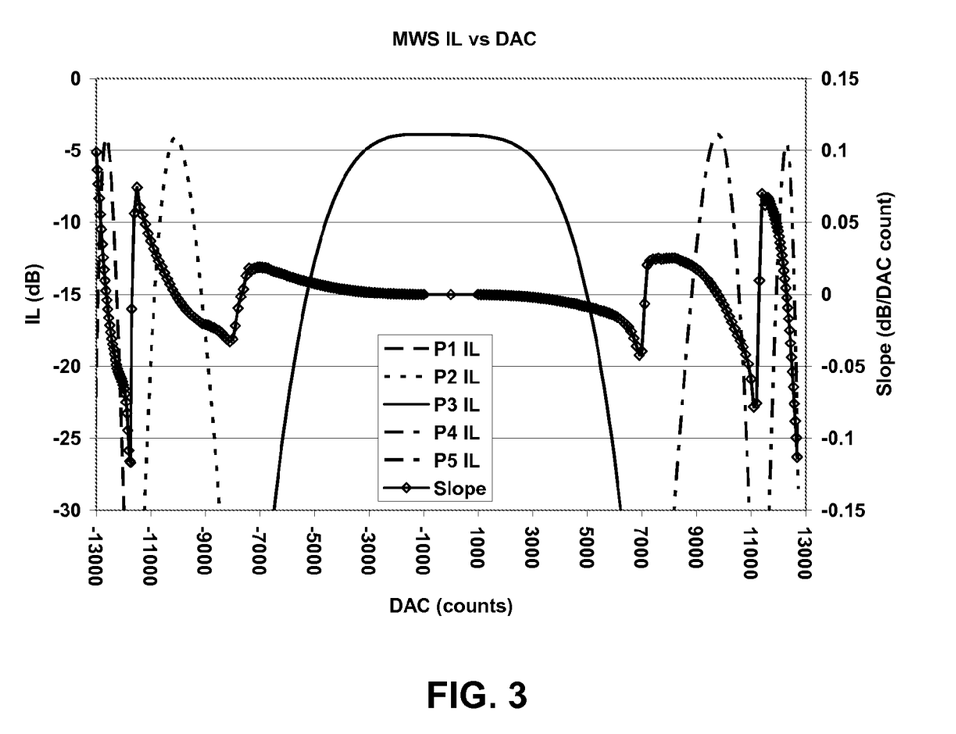
FIG. 3 is a typical MWS electro-optic (EO) response or coupling efficiency curve for all input ports.

In FIG. 3 a typical electro-optic (EO) response of the optical switch 201 such as a MWS is shown. The electrostatic drive voltage applied to a MEMS micro-mirror is represented along the X-axis by a digital number in count units to which the controller 204 sets a input to a digital to analog converter (DAC). The left Y-axis of the graph plots insertion loss (IL) of the optical switch 201 in dB units, while the right Y-axis plots the slope of the IL in units of dB per DAC count. Taking as an example a product designated MWS50 with five input ports P1-P5 (corresponding to input ports 221-225 in FIG. 2), the plotted EO response is for a micro-mirror operating on a central port, P3 (223 in FIG. 2), with a resting position corresponding to zero applied electrostatic drive voltage, or equivalently, zero DAC counts.

In this particular example, the micro-mirror can be deflected to access two neighboring ports on either side of P3 (223 in FIG. 2)—P1, P2 (221, 222 in FIG. 2) on one side and P4, P5 (224, 225 in FIG. 2) on the other.

Figure 4:
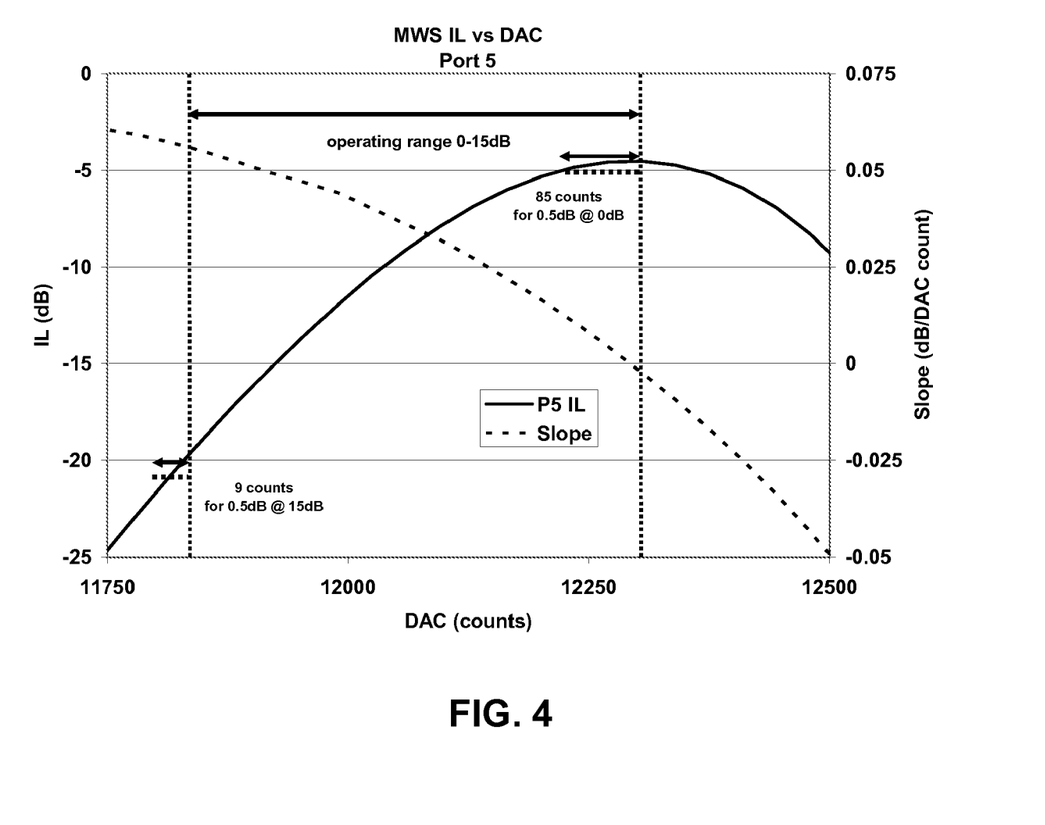
FIG. 4 is a typical electro-optic MWS response curve for Port 5.

Although the angular spacing of the ports in this example is equal, the EO curves are steeper for the outer ports because of the quadratic angular deflection to applied voltage relationship. The slope of the EO curve is shown for all ports in FIG. 3 and in detail for input port P5 in FIG. 4. The left Y-axis of the graph plots IL of the optical switch 201 in dB units from input port P5 (225 in FIG. 2) to output port (210 in FIG. 2), while the right Y-axis plots the slope of the IL in units of dB per DAC count. The IL slope is monotonic and varies substantially over the attenuation region of interest. This is of importance as knowledge of the slope can uniquely identify a position on the EO curve. The DAC count change required to produce a 0.5 dB drop in power is also shown for 0 dB (85 counts) and 15 dB (9 counts) of attenuation.

Figure 5:
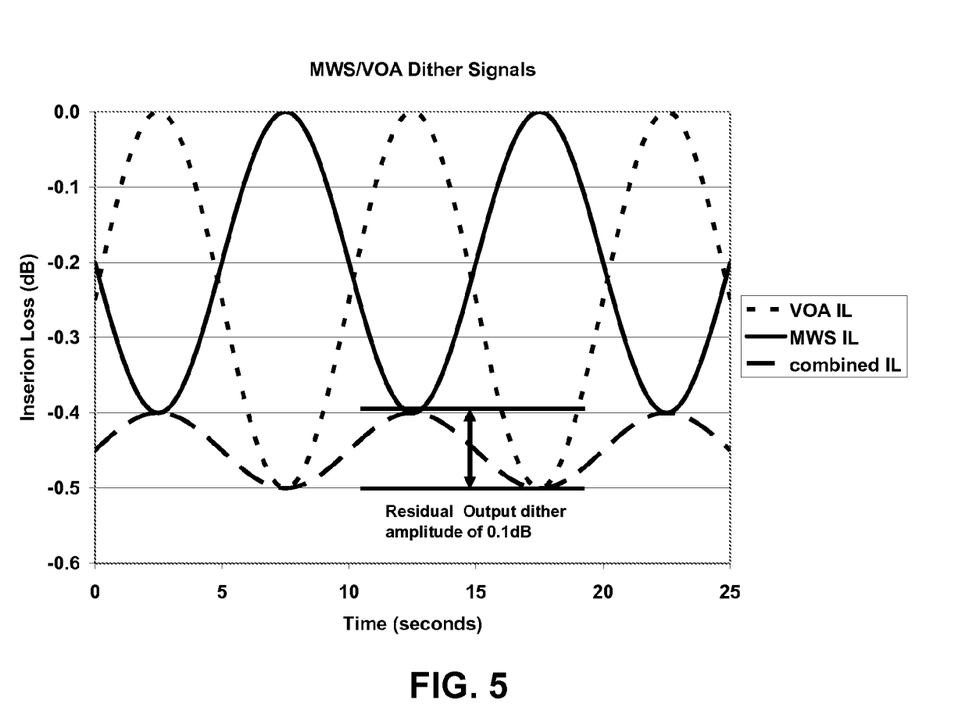
FIG. 5 is a typical insertion loss (IL) characteristic of the MWS and VOA with applied dither signal.

The combined function of the VOA 202 and MEMS micro-mirrors can now be considered. The critical element of this invention is to measure the EO slope without any interruption of the output (common) signal (from output port 210 in FIG. 2). The modulation pattern of an arbitrary channel and the VOA are shown in FIG. 5. The X-axis plots time in seconds, while the Y-axis plots insertion loss (IL). A nominal VOA dither frequency and amplitude of 0.1 Hz and 0.5 dB, respectively, are shown. The solid curve traces out the IL of a MWS, while the dotted curve traces the IL of the VOA, both on the same time axis. The dashed curve represents the residual optical output power dither having an amplitude typically of 0.1 dB.

The MWS IL is dithered with exactly the same frequency and target amplitude except that this signal is out of phase with the VOA dither. The required DAC amplitude to generate a 0.5 dB dither is a function of the channel position on the EO curve. The residual output signal measured by the OCM (205 in FIG. 2) is a measure of the error in the input DAC dither amplitude. This residual signal can be used to compensate the input DAC amplitude and temporally flatten the output response. As the VOA affects all output channels equally, all micro-mirrors may need to be dithered to provide a flat response. The compensation required is a direct function of the drift of the EO curve relative to the start-of-life calibration.

Note in this example a very slow dither frequency of 0.1 Hz has been chosen. The dither frequency needs to be set slow enough to allow the channels for all DACs to be driven with the same dither amplitude and to provide enough time for the OCM to properly sample the residual waveform. Typical OCMs have a response time in the range of 50 msec to 1 sec.

Variations in the input signal power will also be nulled out over time provided they are not at the same frequency as the dither signal. More sophisticated dither waveforms which are not purely sinusoidal can be used to guarantee isolation from potential input amplitude oscillations. Such schemes would be important if a customer is using amplitude modulation in the system. In general the proposed frequency of the dither is much lower (e.g. 0.1 Hz) than traditional tone modulation schemes (>1 kHz).

The end result of aging for most mechanisms in the MWS cause an EO curve shift. The mechanisms include radius of curvature (ROC) drift of the MEMS micro-mirror and opto-mechanical shifting of MWS internal components. It is more accurate to represent the aging of the device as a shift in angular deflection. However given the small drift typically observed, conversion to radial coordinates is usually not warranted. The aging mechanisms are very slow, thus the dither frequency can be quite low to compensate them.

Figure 6:
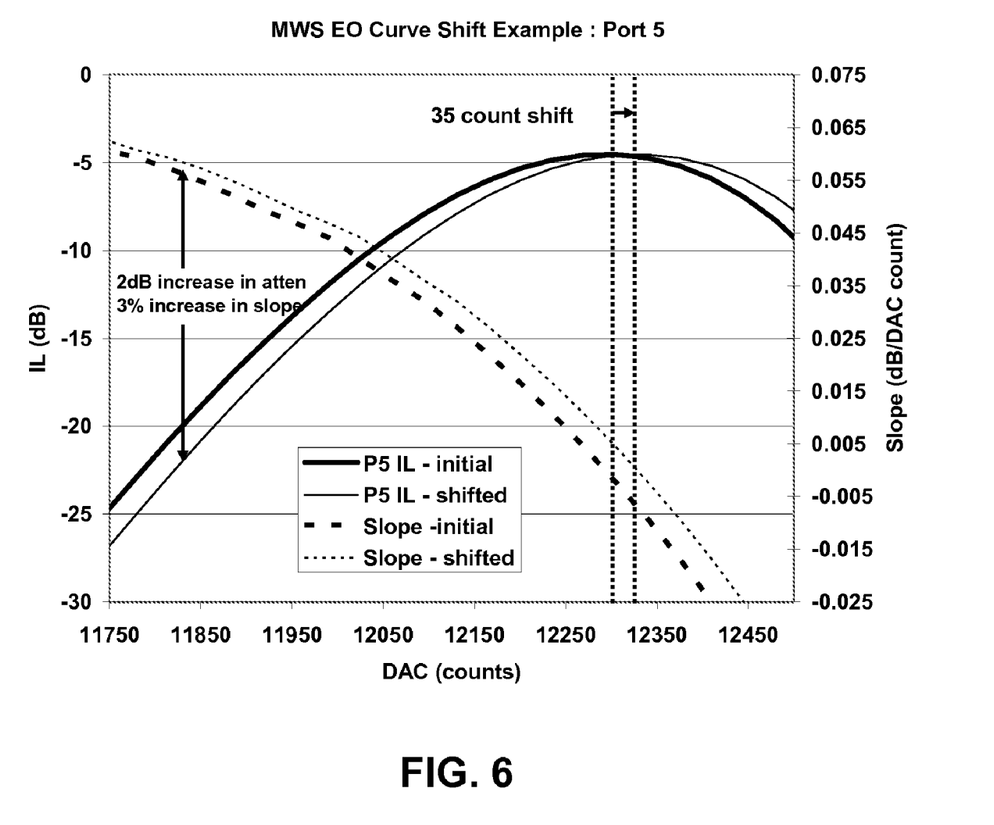
FIG. 6 is a predicted EO curve shift as a result of MWS aging.

A typical EO curve exemplifying the shift expected with aging is shown in FIG. 6. As before, the electrostatic drive voltage applied to a MEMS micro-mirror is represented along the X-axis by a digital number in DAC count units. The left Y-axis of the graph plots IL in dB units, while the right Y-axis plots the slope of the IL in units of dB per DAC count. The thick solid line plots an initial EO curve of an input port, P5 in this example, of a MWS, which would normally be stored as a calibration curve in a controller or other suitable memory unit. The thin solid curve, on the other hand, represents an EO curve of the same input port, P5, that has shifted with drift due to aging or other sources. The corresponding dashed curves plot the slopes of the respective EO curves.

An EO curve drift of nominally 35 DAC counts on input port P5 results in a 2 dB increase in IL at 15 dB (i.e. from −5 dB to −20 dB). This corresponds to a 3% increase in the slope of the EO curve. A MEMS mirror dither which produces 0.5 dB of attenuation initially will now produce 3% more dither, or 0.515 dB resulting in 0.015 dB residual ripple. With long averaging periods of a phase locked output signal detecting scheme, detecting such a residual ripple is achievable.

Note that the shift may be different for each port depending upon the dominant aging mechanism. The channel variability tends to be small, as most mechanisms would tend to affect all channels equally. Micro-mirror to micro-mirror variability from MEMS fabrication processes is a counter-example.

The residual dither signal is a relative measurement and therefore it does not require stability of the output tap (optical tap 212 in FIG. 2, for instance) to function correctly, nor does the OCM need to have good absolute measurement accuracy over a wide dynamic range. However, the measurement accuracy is dependent on a stable VOA dither amplitude. In order to assure this condition the MEMs dither can occasionally be turned off at a time convenient to the customer so that the VOA amplitude can be verified and calibrated.

The controller 204 in FIG. 2 performs several functions. As outlined earlier, it performs basic optical switch 201 configuration by providing driver functions for the optical switch 201 and VOA 202, as well as receiving the output from the OCM 205. Additional features are advantageously integrated in the controller 204 to complete the drift compensation function. These features comprise a storage or memory unit capable of storing calibration values, a micro-processor, micro-controller or similar, which may be programmable, for calculating micro-mirror angular deflections from the VOA dither signal and OCM output, drift correction offsets, storing and updating calculated offset values and implementing the offsets in setting the electrostatic drive voltage for each micro-mirror. The controller 204 also preferably incorporates a feedback routine for providing a servo control system for compensating drift in the optical switch 201 and associated components.

Figure 7:
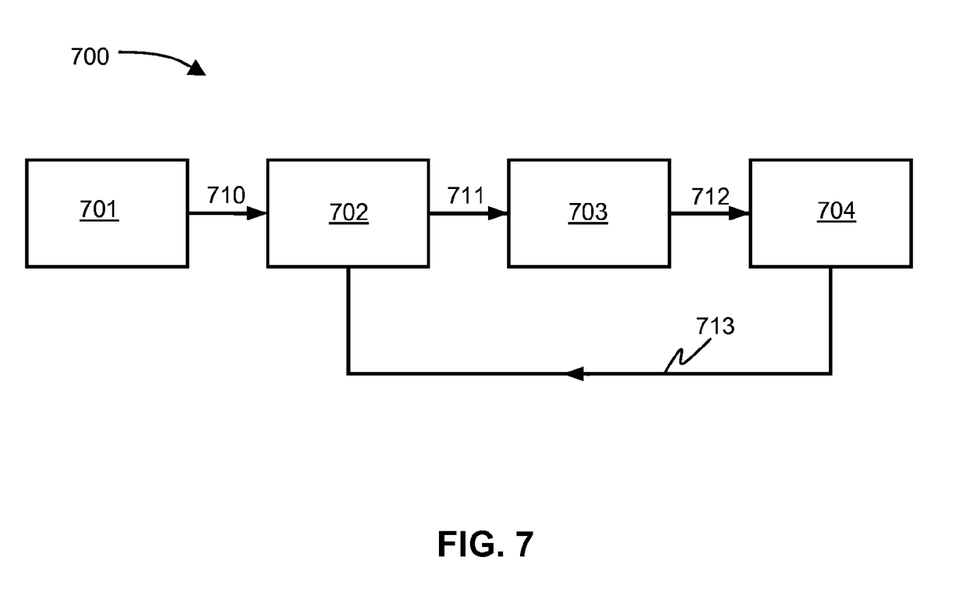
FIG. 7 is a block diagram of a MWS dither feedback algorithm.

Conceptually an embodiment of a feedback routine 700 is shown in FIG. 7. An original calibration file 701 containing initial EO curves for the micro-mirrors and other relevant data remains unaltered in this architecture. An intermediate offset file 702 keeps track of the offset for a given port and channel of the EO curve (in DAC counts). When a specific attenuation level is requested by a customer, the calibration file 701 is queried to determine the required DAC counts 710 for the appropriate input port of the optical switch. The values stored in the offset file 702 are then added to compensate the DAC counts from the calibration file 701 and compensated DAC counts 711 are then transmitted to a DAC, which converts the signal to an electrostatic drive voltage for the relevant micro-mirror in the MWS 703. After passing thought the VOA (not explicitly shown), residual signal 712 from MWS 703 is coupled to the OCM 704. A feedback loop is completed by calculating a new offset value calculated from a power reading 713 from the OCM 704 and updating the offset file 702. The most general expression of the offset file 702 would be a matrix, Offset (Port, $\lambda_x$, Temperature). When a residual signal 712 is non-zero, the compensation can be estimated based on the local slope of the EO curve (in dB/DAC counts). The drift in EO curve is expected to be very slow, therefore the offset file 702 can be adjusted with a time averaged of the residual signal 712 so that the offset file 702 does not fluctuate with short term noise.

In conclusion, an EO slope based attenuation apparatus and measurement technique is disclosed, comprising an optical switch with dither signal applied to MEMS micro-mirrors to produce a dithered attenuation in combination a VOA operated with an anti-phase dither signal. Drift of the attenuation provided by the optical switch can thus be compensated. The attendant optical power dither at the optical switch output gets substantially removed by the VOA, so that adverse effects on the downstream network performance are minimized. The invention can be advantageously applied other optical devices in which insertion loss can be continuously varied by an input control signal.

In summing up, an embodiment of an apparatus and measurement technique for compensating drift in an optical switch is disclosed, comprising the optical switch having a plurality of input ports, an output port, and a switch control, wherein an insertion loss between at least one of the input ports and the output port is controllable by a control signal applied to the switch control.

The drift feedback compensator also includes a variable optical attenuator having an input port optically coupled the output port of the optical switch, a VOA output port and a VOA control, wherein an attenuation between the VOA input port and VOA output port is settable in response to an attenuation setting signal applied to the VOA control, as well as an optical splitter optically coupled the VOA output port for splitting an optical output signal from the VOA output port into a tapped signal and a through signal. An optical channel monitor is optically coupled to the optical splitter to receive the tapped signal and provide a feedback signal. A controller advantageously applies the control signal to the switch control and the attenuation setting signal to the VOA control in response to the feedback signal received from the optical channel monitor.

The attenuation setting signal modulates the attenuation to produce an attenuation modulation at a dither frequency. The control signal is preferably used to modulate the insertion loss to produce an insertion loss modulation at the dither frequency, such that the insertion loss modulation is in anti-phase to the attenuation modulation.

The optical switch in the drift feedback compensator can be a multi-wavelength switch (MWS) or similar.

The controller can advantageously include a memory unit for storing calibration values as well as a processing unit for calculating a micro-mirror control offset.

The dither frequency has period from about 0.1 millisecond to about 1 second.

Typically, the insertion loss modulation and the attenuation modulation sum to a residual ripple that has an amplitude less than about 0.1 dB, the insertion loss modulation has an amplitude from about 0.01 dB to about 1.0 dB and the attenuation modulation has an amplitude from about 0.01 dB to about 1.0 dB.

A method of compensating the drift of an optical switch is also disclosed, comprising the steps of:

a) applying a control voltage to the switch control from the controller based on an initial electro-optic characteristic;

b) applying an optical signal to at least one input port of the optical switch;

c) applying by means of the controller a first dither signal having a dither frequency to the VOA control for producing an attenuation modulation;

d) applying by means of the controller a second dither signal at the dither frequency to the switch control for producing an insertion loss modulation with opposite phase to the attenuation modulation;

e) measuring a residual dither signal at the VOA output port with the optical channel monitor;

f) adjusting an amplitude of the second dither signal to reduce the residual dither signal;

g) calculating a set of correction values from the amplitude of the second dither signal;

h) applying a corrected control voltage to the switch control from the controller, based on the correction values and the initial electro-optic characteristic; and i) periodically repeating steps e) through h).

We claim:

1. A drift feedback compensator for compensating drift comprising:

an optical switch comprising a plurality of input ports, an output port, and a switch control, wherein an insertion loss between at least one of the input ports and the output port is controllable in response to a control signal applied to the switch control;

a variable optical attenuator having a VOA input port optically coupled the output port of the optical switch, a VOA output port and a VOA control, wherein an attenuation between the VOA input port and VOA output port is settable in response to an attenuation setting signal applied to the VOA control;

an optical splitter optically coupled to the VOA output port for splitting an optical output signal from the VOA output port into a tapped signal and a through signal;

an optical channel monitor optically coupled to the optical splitter for receiving the tapped signal and providing a feedback signal; and a controller for applying the control signal to the switch control and the attenuation setting signal to the VOA control in response to the feedback signal received from the optical channel monitor;

wherein the control signal modulates the insertion loss to produce an insertion loss modulation at a dither frequency, wherein the attenuation setting signal modulates the attenuation to produce an attenuation modulation at the dither frequency, and wherein the insertion loss modulation is anti-phase to the attenuation modulation.

2. The drift feedback compensator claimed in claim 1, wherein the optical switch is a MWS.

3. The drift feedback compensator claimed in claim 1, wherein the controller further comprises a memory unit for storing calibration values.

4. The drift feedback compensator claimed in claim 1, wherein the controller further comprises a processing unit for calculating a control offset.

5. The drift feedback compensator claimed in claim 1, wherein the dither frequency has period from about 0.1 millisecond to about 1.0 second.

6. The drift feedback compensator claimed in claim 1, wherein the insertion loss modulation and the attenuation modulation sum to a residual ripple that has an amplitude which is less than about 0.1 dB.

7. The drift feedback compensator claimed in claim 1, wherein the insertion loss modulation has an amplitude from about 0.01 dB to about 1.0 dB.

8. The drift feedback compensator claimed in claim 1, wherein the attenuation modulation has an amplitude from about 0.01 dB to about 1.0 dB.

9. A method of compensating the drift of the optical switch as defined in claim 1, comprising the steps of:

a) applying a control voltage to the switch control from the controller based on an initial electro-optic characteristic;

b) applying an optical signal to at least one input port of the optical switch;

c) applying by means of the controller a first dither signal having a dither frequency to the VOA control for producing an attenuation modulation;

d) applying by means of the controller a second dither signal at the dither frequency to the switch control for producing an insertion loss modulation with opposite phase to the attenuation modulation;

e) measuring a residual dither signal at the VOA output port with the optical channel monitor;

f) adjusting an amplitude of the second dither signal to reduce the residual dither signal;

g) calculating a set of correction values from the amplitude of the second dither signal;

h) applying a corrected control voltage to the switch control from the controller, based on the correction values and the initial electro-optic characteristic; and i) periodically repeating steps e) through h).

10. The method of compensating the drift of the optical switch claimed in claim 9, wherein the optical switch is a MWS.

11. The method of compensating the drift of the optical switch claimed in claim 9, wherein the controller further comprises a memory unit for storing the initial electro-optic characteristic.

12. The method of compensating the drift of the optical switch claimed in claim 9, wherein the controller further comprises a processing unit for calculating the set of correction values.

13. The method of compensating the drift of the optical switch claimed in claim 9, wherein the dither frequency has period from about 0.1 millisecond to about 1.0 second.

14. The method of compensating the drift of the optical switch claimed in claim 9, wherein the insertion loss modulation has an amplitude from about 0.01 dB to about 1.0 dB.

15. The method of compensating the drift of the optical switch claimed in claim 9, wherein the attenuation modulation has an amplitude from about 0.01 dB to about 1.0 dB.

16. The method of compensating the drift of the optical switch claimed in claim 9, wherein the residual dither signal has an amplitude that is less than about 0.1 dB.

17. The method of compensating the drift of the optical switch claimed in claim 9, wherein the initial electro-optic characteristic is stored in a calibration file.

18. The method of compensating the drift of the optical switch claimed in claim 9, wherein the set of correction values is stored in an offset file.

* * * * *